United States Patent [19]

Inukai et al.

[11] Patent Number: 4,635,033

[45] Date of Patent: Jan. 6, 1987

[54] DISPLAY SYSTEM FOR AUTOMOTIVE VEHICLE

[75] Inventors: Kazuo Inukai, Nagoya; Takeshi Haluyama, Kariya, both of Japan

[73] Assignee: Nippondenso Co., Ltd., Kariya, Japan

[21] Appl. No.: 716,458

[22] Filed: Mar. 27, 1985

[30] Foreign Application Priority Data

Mar. 28, 1984 [JP] Japan ................................. 59-60037

[51] Int. Cl.⁴ .............................................. B60Q 1/00
[52] U.S. Cl. .................... 340/52 F; 340/97; 340/98; 340/103; 340/705; 340/980; 340/815.08; 350/283
[58] Field of Search ................ 340/52 F, 705, 87, 97, 340/98, 103, 124, 145, 980, 815.06–815.09; 350/283, 284

[56] References Cited

U.S. PATENT DOCUMENTS

| | | | |
|---|---|---|---|
| 3,274,545 | 9/1966 | Bowles et al. | 340/705 |
| 4,190,832 | 2/1980 | Mohler | 340/705 |
| 4,403,216 | 9/1983 | Yokoi | 340/705 |

FOREIGN PATENT DOCUMENTS 52-35785  8/1977  Japan ...................................... 340/97

Primary Examiner—Donnie L. Crosland
Attorney, Agent, or Firm—Cushman, Darby & Cushman

[57] ABSTRACT

A display system adapted to a dashboard in a vehicle compartment, the dashboard including an instrument panel and a hood located above the instrument panel and below a front windshield of the vehicle compartment, wherein the instrument panel is provided with a first opening directed toward the driver's seat in the compartment, and the hood is provided with a second opening directed toward the internal surface of the front windshield, and wherein the display system comprises an indicator mounted within the dashboard in such a manner than the display surface of the indicator is opposed to the second opening, a mirror plate arranged within the dashboard and movable between a first position in which the mirror plate reflects visual rays representative of information on the indicator toward the first opening and blocks the visual rays toward the second opening and a second position in which the mirror plate permits the visual rays toward the second opening and blocks the visual rays toward the first opening, and an electric drive mechanism for selectively actuating the mirror plate from the first position to the second position and vice versa.

6 Claims, 7 Drawing Figures

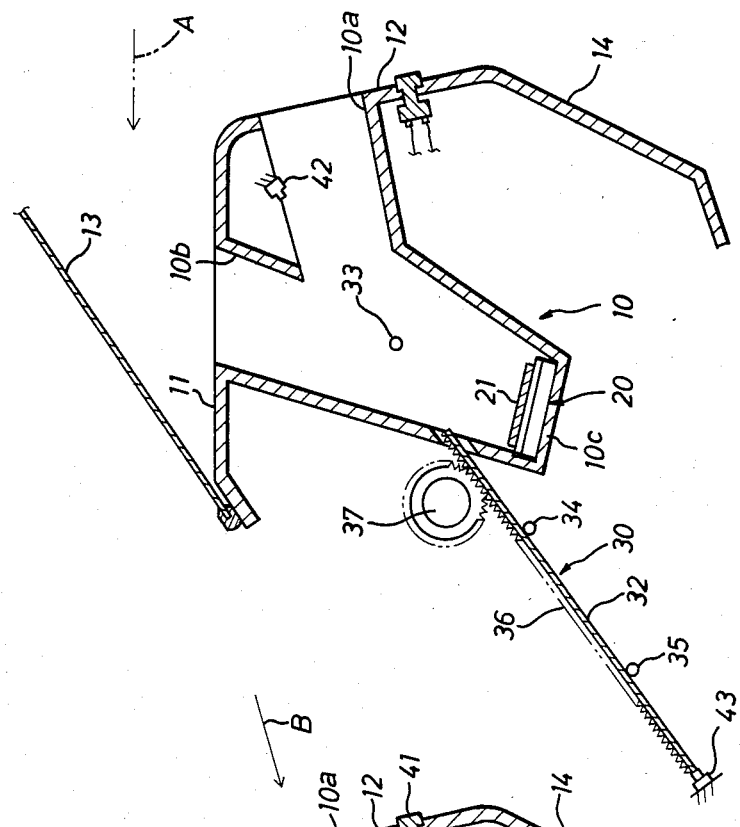
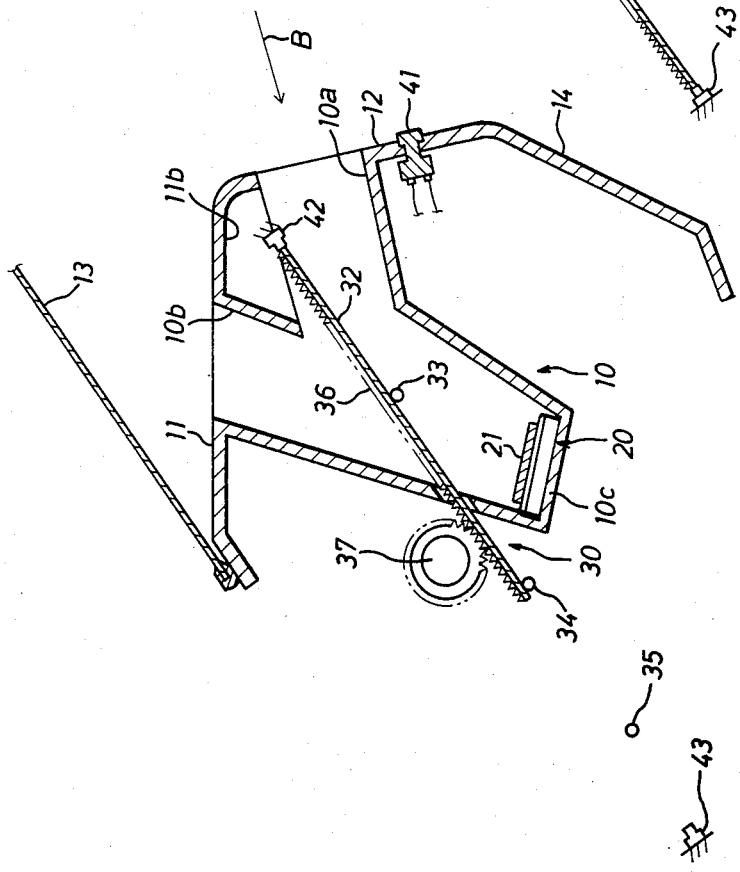

DISPLAY SYSTEM FOR AUTOMOTIVE VEHICLE

BACKGROUND OF THE INVENTION

1. Field of the Invention

The present invention relates to a display system for automotive vehicles, and more particularly to a display system adapted to a dashboard in the vehicle compartment for visually displaying instantaneous information of an indicator to the driver selectively in a frame of an instrument panel or on the internal surface of a front windshield of the vehicle.

2. Description of the Prior Art

In the Japanese utility model early publication No. 52-35785, there is disclosed a display system which includes a speed indicator mounted within a dashboard to visually display an instantaneous vehicle speed to the driver, a first half mirror arranged in front of the indicator to partly permit visual rays representative of the speed directed therethrough to the driver, a second half mirror attached to the internal surface of a front windshield to receive the visual rays reflected by the first half mirror and to reflect the same toward the driver, and a shutter arranged to selectively block the visual rays reflected by the first half mirror toward the second half mirror. In the display system, when the shutter is closed to block the visual rays toward the second half mirror, the luminosity of the rays toward the driver is decreased by intervention of the first half mirror, resulting in unclearness of the speed display to the driver. When the shutter is opened to permit the visual rays toward the second half mirror, the driver is advised as to the speed displayed through the first half mirror and on the second half mirror. This results in psychological confusion of the driver in recognition to the speed displayed at the two places.

SUMMARY OF THE INVENTION

It is, therefore, a primary object of the present invention to provide a display system wherein a mirror plate is arranged to visually display instantaneous information of an indicator to the driver selectively in a frame of an instrument panel or on the internal surface of a front windshield without any decrease of the luminosity of rays representative of the information.

According to the present invention, the primary object is attained by providing a display system adapted to a dashboard in a vehicle compartment, the dashboard including an instrument panel and a hood located above the instrument panel and below a front windshield of the vehicle compartment, wherein the instrument panel is provided with a first opening directed toward the driver's seat in the vehicle compartment, and the hood is provided with a second opening directed toward the internal surface of the front windshield, and wherein the display system comprises an indicator mounted within the dashboard in such a manner that the display surface of the indicator is opposed to the second opening, a mirror plate arranged within the dashboard and movable between a first position in which the mirror plate reflects visual rays representative of information on the indicator toward the first opening and blocks the visual rays toward the second opening and a second position in which the mirror plate permits the visual rays toward the second opening and blocks the visual rays toward the first opening, and means for selectively actuating the mirror plate from the first position to the second position and vice versa.

In the display system described above, when the mirror plate is maintained in the first position during low speed travel of the vehicle, the visual rays representative of the information on the indicator are reflected by the mirror plate to direct toward the driver's seat through the first opening of the instrument panel. Thus, the driver is advised as to the instantaneous information clearly displayed as a standing virtual image in the frame of the first opening without any decrease of the luminosity of the rays. Such display of the information is useful to the driver when he keeps his eyes on the forward near view. When the mirror plate is maintained in the second position during high speed travel of the vehicle, the visual rays are permitted to direct to the internal surface of the front windshield through the second opening and formed as a standing virtual image on the same surface. Thus, when the driver keeps his eyes on the forward distant view, he is advised as to the instantaneous information clearly displayed on the internal surface of the front windshield without any decrease of the luminosity of the rays.

BRIEF DESCRIPTION OF THE DRAWINGS

Additional objects, features and advantages of the present invention will become readily apparent from the following detailed description of a preferred embodiment thereof and its modification when considered with reference to the attached drawings, in which:

FIGS. 6 and 7 illustrate a modification of the display system in sectional form.

DETAILED DESCRIPTION OF THE PREFERRED EMBODIMENT

Figure 2:
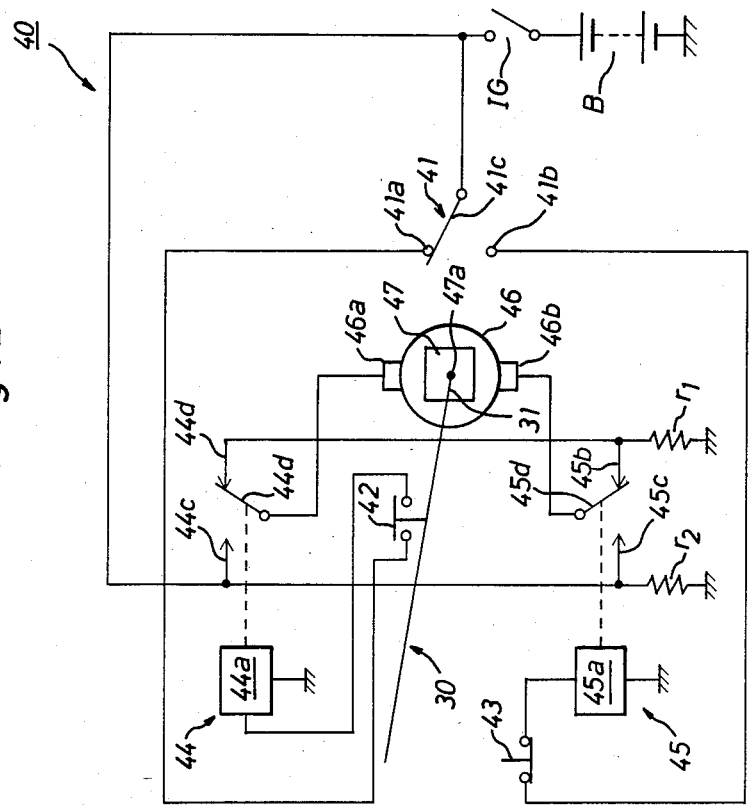
FIG. 2 illustrates an electric drive circuit for a mirror plate in the display system of FIG. 1.
Figure 1:
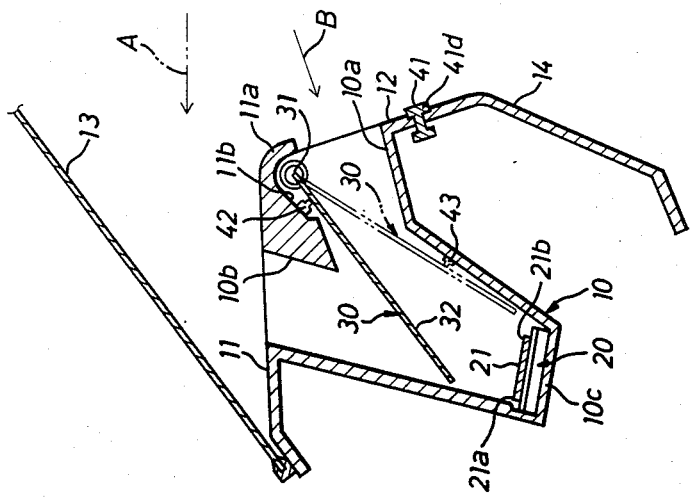
FIG. 1 is a sectional view illustrating a display system for an automotive vehicle in accordance with the present invention.
Figure 3:
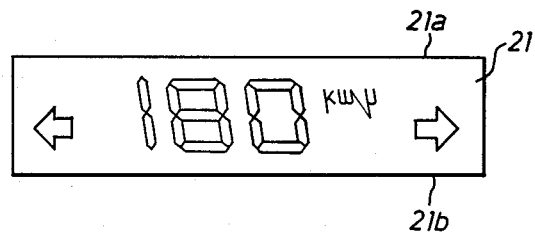
FIG. 3 illustrates a display pattern of a luminous indicator in the display system.

Referring now to the drawings, particularly in FIGS. 1 and 2, there is illustrated a display system for an automotive vehicle in accordance with the present invention. The display system includes a luminous indicator 20 installed within a container 10, and a rectangular mirror plate 30 fixed at its upper end 31 to an output shaft 47a of a speed reduction gearing 47 which is associated with a DC motor 46 as described in detail later. As shown in FIG. 1, the container 10 is arranged within a dashboard 14 of the vehicle which includes an instrument panel 12, and a hood 11 located below a front windshield 13 and extended above the instrument panel 12. In such an arrangement, the container 10 is located below the hood 11 and behind the instrument panel 12 and is integrally provided therewith. The instrument panel 12 is formed with an opening 10a directed to the interior of container 10, and the hood 11 is formed with an upper opening 10b in a common vertical plane with the opening 10a. The luminous indicator 20 is fixed at the bottom 10c of container 10 in such a manner that a display surface 21 of indicator 20 is opposed to the internal surface of front windshield 13 through the upper opening 10b. The front end 21a of display surface 21 is located at the same side as the lower end portion of windshield 13, while the rear end 21b of display surface 21 is located at the same side as the instrument panel 12. As is illustrated in FIG. 3, the display pattern of luminous indicator 20 is arranged in reverse such that information signs such as a speed indication of 180 Km/h appearing on the display surface 21 are formed as a standing virtual image on the internal surface of windshield 13 which is visually displayed to the driver.

The rectangular mirror plate 30 is formed at its underside with a reflection surface and extends downwardly toward the luminous indicator 20. The DC motor 46 and the speed reduction gearing 47 are mounted within the hood 11 in such a manner that the output shaft 47a of speed reduction gearing 47 extends into a recessed portion 11b of hood 11. Thus, the rectangular mirror plate 30 is arranged to be vertically movable between upper and lower positions. When the mirror plate 30 is maintained in the upper position, the display surface 21 of indicator 20 is blocked from the upper opening 10b so that visible rays representative of the information signs on indicator 20 are reflected by the mirror plate 30 to direct toward the upper portion of the driver's seat through the opening 10a of instrument panel 12. When the mirror plate 30 is moved downward and maintained in the lower position, as shown by imaginary lines in FIG. 1, the display surface 21 of indicator 20 is blocked from the opening 10a to direct the visible rays toward the internal surface of front windshield 13 through the upper opening 10b.

As shown in FIG. 2, an electric drive circuit 40 for the DC motor 46 includes a selector switch 41, a pair of normally closed limit switches 42, 43, and a pair of relays 44, 45. The selector switch 41 includes a pair of fixed contacts 41a, 46b, and a movable contact 46c connected to the positive terminal of a DC source in the form of a vehicle battery B through an ignition switch IG for the vehicle prime mover. As can be well seen in FIG. 1, the selector switch 41 is in the form of a pushbutton or pull switch mounted on the lower portion of instrument panel 12 to selectively connect the movable contact 41c with the fixed contact 41a or 41b.

As shown in FIG. 1, the normally closed limit switch 42 is fixedly arranged within the recessed portion 11b of hood 11 to be opened by engagement with the upper surface of mirror plate 30. When the mirror plate 30 is maintained in the lower position, the limit switch 42 is maintained in its closed condition to connect therethrough an electromagnetic coil 44a of relay 44 to the fixed contact 41a of selector switch 41. When the mirror plate 30 is moved upwards and maintained in the upper position, the limit switch 42 is opened by engagement with the upper surface of mirror plate 30 to disconnect the electromagnetic coil 44a from the fixed contact 41a of selector switch 41. On the other hand, the normally closed limit switch 43 is fixedly mounted on the inner wall of container 10 to be opened by engagement with the under surface of mirror plate 30. When the mirror plate 30 is maintained in the upper position, the limit switch 43 is maintained in its closed condition to connect therethrough an electromagnetic coil 45a of relay 45 to the fixed contact 41b of selector switch 41. When the mirror plate 30 is moved downwards and maintained in the lower position, the limit switch 43 is opened by engagement with the under surface of mirror plate 30 to disconnect the electromagnetic coil 45a from the fixed contact 41b.

The relay 44 includes a double throw switch having a pair of fixed contacts 44b, 44c and a movable contact 44d. The fixed contact 44b is grounded through a resistor $r_1$, the fixed contact 44c is grounded through a resistor $r_2$ and connected to the positive terminal of DC source B through the ignition switch IG, and the movable contact 44d is connected to a first input terminal 46a of DC motor 46. Assuming that after the ignition switch IG is closed, the selector switch 41 is conditioned to connect the movable contact 41c to the fixed contact 41a and that the mirror plate 30 is in the lower position, the electromagnetic coil 44a of relay 44 is energized by the electric power applied thereto from the DC source B through the ignition switch IG, the selector switch 41 and the normally closed limit switch 42, and in turn, the movable contact 44d is connected to the fixed contact 44c in response to energization of the electromagnetic coil 44a. When the mirror plate 30 is moved upwards and maintained in the upper position, the normally closed limit switch 42 is opened by engagement with the mirror plate 30 to deenergize the electromagnetic coil 44a of relay 44, and in turn, the movable contact 44d is connected to the fixed contact 44b in response to deenergization of the electromagnetic coil 44a.

The relay 45 includes a double throw switch having a pair of fixed contacts 45b, 45c, and a movable contact 45d. The fixed contact 45b is grounded through resistor $r_1$, the fixed contact 45c is grounded through resistor $r_2$ and connected to the positive terminal of DC source B through the ignition switch IG, and the movable contact 45d is connected to a second input terminal 46b of DC motor 46. Assuming that after the ignition switch IG is closed, the selector switch 41 is conditioned to connect the movable contact 41c to the fixed contact 41b and that the mirror plate 30 is in the upper position, the electromagnetic coil 45a of relay 45 is energized by the electric power applied thereto from the DC source B through the ignition switch IG, the selector switch 41 and the normally closed limit switch 43, and in turn, the movable contact 45d is connected to the fixed contact 45c in response to energization of the electromagnetic coil 44a. When the mirror plate 30 is moved downwards and maintained in the lower position, the normally closed limit switch 43 is opened by engagement with the mirror plate 30 to deenergize the electromagnetic coil 45a of relay 45, and in turn, the movable contact 45d is connected to the fixed contact 45b in response to deenergization of the electromagnetic coil 44a.

When the movable contact 45d is connected to the fixed contact 45c in response to energization of the electromagnetic coil 45a during deenergization of the electromagnetic coil 44a, the DC motor 46 rotates under supply of the electric power to its second input terminal 46b through contacts 45c, 45d and cooperates with the speed reduction gearing 47 to effect downward movement of the mirror plate 30. When the movable contact 44d is connected to the fixed contact 44c in response to energization of the electromagnetic coil 44a during deenergization of the electromagnetic coil 45a, the DC motor 46 rotates in reverse under supply of the electric power to its first input terminal 46a through contacts 44c, 44d and cooperates with the speed reduction gearing 17 to effect upward movement of the mirror plate 30.

Figure 5:
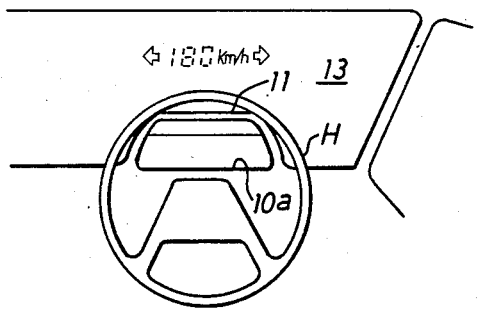
FIG. 5 illustrates a visual diaplay on the internal surface of a front windshield of the vehicle.

Assuming that the pushbutton of selector switch 41 is operated to connect the movable contact 41c to the fixed contact 41b during travel of the vehicle at a high speed, the electromagnetic coil 45a is energized to connect the movable contact 45d to the fixed contact 45c, and in turn, the DC motor 46 rotates under supply of the electric power to its second input terminal 46b and cooperates with the speed reduction gearing 47 to effect downward movement of the mirror plate 30. Subsequently, the limit switch 42 is closed in response to disengagement from the mirror plate 30, and the limit switch 43 is opened by engagement with the mirror plate 30 to deenergize the electromagnetic coil 45a. As a result, the electric power supply is interrupted to stop the DC motor 46, and in turn, the speed reduction gearing 47 acts to maintain the mirror plate 30 in the lower position. In such a condition, the visible rays representative of the information signs on indicator 20 are permitted to direct to the internal surface of front windshield 13 through the upper opening 10b and formed as a standing virtual image on the same surface as is illustrated in FIG. 5. On the other hand, the mirror plate 30 blocks the visible rays directed toward the opening 10a of instrument panel 12. When the driver keeps his eyes on the forward distant view as shown by an arrow A in FIG. 1, he is advised as to the instantaneous information signs clearly displayed on the internal surface of windshield 13 without any decrease of the luminosity.

Figure 4:
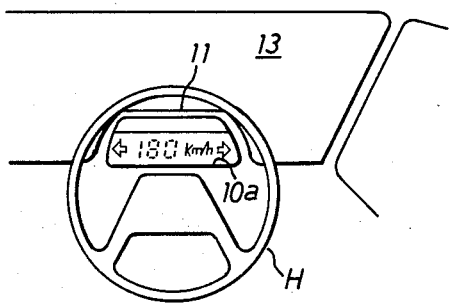
FIG. 4 illustrates a visual display in the frame of an instrument panel of the vehicle dashboard.

If during high speed travel of the vehicle the displayed information signs are disturbed by sunshine, headlight beams entering into the front windshield 13 or the background reflected in the windshield 13, the pushbutton of selector switch 41 will be operated to connect the movable contact 41c to the fixed contact 41a. Thus, the electromagnetic coil 44a of relay 44 is energized to connect the movable contact 44d to the fixed contact 44c, and in turn, the DC motor 46 rotates in reverse under supply of the electric power to its first input terminal 46a to cooperate with the speed reduction gearing 47 for effecting upward movement of mirror plate 30. Subsequently, the lower limit switch 43 is closed in response to disengagement from the mirror plate 30, while the upper limit switch 42 is opened by engagement with the upper surface of mirror plate 30 to deenergize the electromagnetic coil 44a. As a result, the electric power supply is interrupted to stop the DC motor 46, and in turn, the speed reduction gearing 47 acts to maintain the mirror plate 30 in the upper position. The gear ratio of speed reduction gearing 47 is determined to reliably hold the mirror plate 30 in place against its gravity. In such a condition, the visible rays representative of the information signs on indicator 20 are reflected by the underside surface 32 of mirror plate 30 to direct into the vehicle compartment through the opening 10a of instrument panel 12. As is illustrated in FIG. 4, the driver is advised as to the instantaneous information signs clearly displayed as a standing virtual image in the frame of opening 10a of instrument panel 12 without any decrease of the luminosity. Such display of the information signs is useful to the driver when he keeps his eyes on the forward near view during low speed travel of the vehicle on a street road.

In the actual practice of the present invention, the above-described embodiment may be modified as follows.

(a) The mirror plate 30 may be substituted for a synthetic resin or metallic plate formed with a mirror surface.

(b) The front windshield 13 may be coated on its internal surface with a transparent material for more clear display of the information signs.

(c) The DC motor 46 may be substituted for another actuator such as a hydraulic motor, a linear actuator or the like.

(d) The pushbutton of selector switch 41 may be mounted on a portion of the steering wheel of the vehicle.

(e) The mirror plate 30 may be manually operated by an operation lever which is connected in an appropriate manner to the upper end 31 of mirror plate 30 and arranged to be operated by the driver. In such a case, the operation lever is provided with a hook for maintaining the mirror plate 30 in the upper position.

(f) The selector switch 41 may be automatically switched over by an output signal from a light sensor which is mounted on the hood 11 to detect the intensity of sunshine and headlight beam entering into the driver's eyes through the windshield 13.

(g) The luminous indicator 20 may be arranged in the container 10 in such a manner that the display surface 21 of indicator 20 is opposed to the opening 10a of instrument panel 12. In such a case, the mirror plate 30 is arranged to reflect the visible rays from indicator 20 toward the upper opening 10b and to direct them to the internal surface of windshield 13.

(h) The mirror plate 30 may be arranged to move across the peripheral wall of container 10 as shown in FIGS. 6 and 7. In such an arrangement, the mirror plate 30 is slidably supported by three pairs of rollers 33, 34, 35, and a pinion 37 is arranged at the front side of container 10 to be driven by the DC motor 46 through the speed reduction gearing 47. The mirror plate 30 is provided at the upper surface thereof with a rack portion 36 in mesh with the pinion 37.

In the modification of h), the limit switches 42 and 43 are arranged in an appropriate manner to be engaged with the opposite ends of mirror plate 30. Assuming that the pushbutton of selector switch 41 is conditioned to connect the movable contact 41c to the fixed contact 41a and that the mirror plate 30 is maintained in the upper portion, the upper limit switch 42 is opened by engagement with the upper end of mirror plate 30 to interrupt the electric power supply to the first input terminal 46a of DC motor 46, while the lower limit switch 43 is maintained in its closed condition. In such a condition, the DC motor 46 is stopped, and the speed reduction gearing 47 acts to hold the mirror plate 30 in the upper position. When the pushbutton of selector switch 41 is operated to connect the movable contact 41c to the fixed contact 41b, the DC motor 46 is supplied at its first input terminal 46a with the electric power in such a manner as described above, and the pinion 37 is driven by rotation of the DC motor 46 to effect downward movement of the mirror plate 30. Subsequently, the upper limit switch 42 is closed, and the lower limit switch 43 is opened by engagement with the lower end of mirror plate 30 to interrupt the electric power supply to the DC motor 46. As a result, the DC motor 46 stops, and the speed reduction gearing 47 acts to hold the mirror plate 30 in the lower position. Other operation will be understood from the operation of the electric drive circuit 40 for the embodiment described above.

Although there have been described above specific arrangements of a display system in accordance with the present invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A display system adapted to be disposed in a dashboard in a vehicle compartment, the dashboard including an instrument panel and a hood located above the instrument panel and below a front windshield of said vehicle compartment, wherein the instrument panel is provided with a first opening directed toward a driver's seat in the vehicle compartment, and the hood is provided with a second opening directed toward an internal surface of the front windshield, said display system comprising:

indicator means mounted within said dashboard, for forming an inverted image indicative of display information, a display surface of said indicator means being opposed to the internal surface of the windshield through the second opening;

mirror means, arranged within the dashboard and movable between a first position and a second position, for, in the first position: (1) reflecting visual rays representative of the display information on said indicator means before such rays reach the second opening toward the first opening to provide the information as an erected virtual image within a frame of the first opening, and (2) blocking the visual rays propogating toward the second opening and for, in the second position: (a) permitting the visual rays propagating toward the second opening ing to provide the information as an erected virtual image on the internal surface of said windshield and (b) blocking the visual rays toward the first opening and means for selectively actuating said mirror means between the first and second positions.

2. A display system as recited in claim 1, wherein said mirror means is pivoted at an upper end thereof to an inner shoulder of said hood and extends downwardly toward the display surface of said indicator means, and wherein said actuating means comprises a reversible motor mounted within said hood, a speed reduction gearing associated with said motor and operatively connected to the upper end of said mirror means, and an electric drive circuit for switching over the electric power supply to said motor to selectively effect downward and upward movements of said mirror means through said speed reduction gearing.

3. A display system as recited in claim 1, wherein said mirror means is arranged to be slidably movable to a predetermined inclination angle within said dashboard, and wherein said actuating means comprises a reversible motor mounted within said dashboard, a speed reduction gearing associated with said motor and drivingly connected to said mirror means, and an electric drive circuit for switching over the electric power supply to said motor to selectively effect downward and upward sliding movements of said mirror means.

4. A display system as recited in claim 1, wherein said actuating means comprises a reversible motor mounted within said dashboard, a speed reduction gearing associated with said motor and drivingly connected to said mirror means, and electric drive means for switching over the electric power supply to said motor to selectively effect movements of said mirror means between the first and second positions.

5. A display system as recited in claim 4, wherein said electric drive circuit includes a manually operable selector switch mounted on said instrument panel for switching over the electric power supply to said motor.

6. A display system as recited in claim 5, wherein said selector switch is in the form of a push button switch mounted on said instrument panel.

* * * * *